US010715906B2

(12) United States Patent
Wilker et al.

(10) Patent No.: US 10,715,906 B2
(45) Date of Patent: Jul. 14, 2020

(54) MODULAR QUICK-CONNECT A/V SYSTEM AND METHODS THEREOF

(71) Applicant: Sonic Blocks, Inc., Binghamton, NY (US)

(72) Inventors: Scott D. Wilker, North Haledon, NJ (US); Jordan D. Wilker, North Haledon, NJ (US)

(73) Assignee: Sonic Blocks, Inc., Alexandria, VA (US)

( * ) Notice: Subject to any disclaimer, the term of this patent is extended or adjusted under 35 U.S.C. 154(b) by 0 days.

(21) Appl. No.: 16/043,018

(22) Filed: Jul. 23, 2018

(65) Prior Publication Data

US 2018/0332384 A1 Nov. 15, 2018

Related U.S. Application Data

(60) Continuation of application No. 15/160,550, filed on May 20, 2016, now Pat. No. 10,034,079, which is a
(Continued)

(51) Int. Cl.
*H04R 1/28* (2006.01)
*H04R 1/02* (2006.01)
(Continued)

(52) U.S. Cl.
CPC ............ *H04R 1/2803* (2013.01); *G10L 15/22* (2013.01); *H04R 1/02* (2013.01); *H04R 1/026* (2013.01);
(Continued)

(58) Field of Classification Search
CPC ........ H04R 1/2803; H04R 3/04; H04R 1/028; H04R 1/02; H04R 1/323; H04R 1/08; H04R 1/026; H04R 1/403; H04R 2420/09; H04R 2420/07; H04R 2201/028; H04R 2499/15; H04R 2227/003; H04R 27/00; G10L 15/22
See application file for complete search history.

(56) References Cited

U.S. PATENT DOCUMENTS 9,081,269 B2 * 7/2015 Conti .................. F21V 23/0435
2005/0256720 A1 * 11/2005 Iorio ...................... G08B 21/24
704/275
(Continued)

*Primary Examiner* — Tuan D Nguyen
(74) *Attorney, Agent, or Firm* — Hoffberg & Associates; Steven M. Hoffberg

(57) ABSTRACT

A modular speaker system, comprising an exoskeleton, configured to mechanically support and quick attach and release at least one functional panel and an electrical interface provided within the exoskeleton, configured to mate with a corresponding electrical connector of the functional panel. An optional endoskeleton is provided to support internal components. The system preferably provides a digital electronic controller, and the electrical interface is a digital data and power bus, with multiplexed communications between the elements of the system. The elements of the system preferably include at least one speaker, and other audiovisual and communications components. Multiple modules may be interconnected, communicating through the electrical interface. A base module may be provided to provide power and typical control, user and audiovisual interface connectors.

20 Claims, 5 Drawing Sheets

Related U.S. Application Data division of application No. 14/623,079, filed on Feb. 16, 2015, now Pat. No. 9,332,227.

(60) Provisional application No. 61/940,311, filed on Feb. 14, 2014.

(51) Int. Cl.
  *H04R 1/32* (2006.01)
  *H04R 3/04* (2006.01)
  *G10L 15/22* (2006.01)
  *H04R 1/08* (2006.01)
  *H04R 1/40* (2006.01)
  *H04R 27/00* (2006.01)

(52) U.S. Cl.
  CPC ............... *H04R 1/028* (2013.01); *H04R 1/08* (2013.01); *H04R 1/323* (2013.01); *H04R 3/04* (2013.01); *H04R 1/403* (2013.01); *H04R 27/00* (2013.01); *H04R 2201/028* (2013.01); *H04R 2227/003* (2013.01); *H04R 2420/07* (2013.01); *H04R 2420/09* (2013.01); *H04R 2499/15* (2013.01)

(56) References Cited

U.S. PATENT DOCUMENTS

| | | | |
|---|---|---|---|
| 2008/0021706 A1* | 1/2008 | Bruwer | H04R 27/00 704/233 |
| 2010/0177909 A1* | 7/2010 | Aarts | H04R 1/403 381/92 |
| 2012/0068832 A1* | 3/2012 | Feldstein | F16M 11/041 340/12.5 |
| 2013/0293666 A1* | 11/2013 | Jiang | H04N 7/15 348/14.08 |
| 2014/0185842 A1* | 7/2014 | Kang | H04R 5/02 381/303 |
| 2016/0019907 A1* | 1/2016 | Buck | G10L 15/22 704/226 |

* cited by examiner

MODULAR QUICK-CONNECT A/V SYSTEM AND METHODS THEREOF

CROSS REFERENCE TO RELATED APPLICATION

The present application is a Continuation of U.S. patent application Ser. No. 15/160,550, filed May 20, 2016, now U.S. Pat. No. 10,034,079, issued Jul. 24, 2018, which is a Division of U.S. patent application Ser. No. 14/623,941, filed Feb. 17, 2015, now U.S. Pat. No. 9,351,060, issued May 24, 2016, which is a non-provisional of U.S. Provisional Application 61/940,311, filed Feb. 14, 2014, the entirety of which are each expressly incorporated herein by reference. The application is related to U.S. patent application Ser. No. 15/160,656, filed May 20, 2016, now U.S. Pat. No. 9,794,679, issued Oct. 17, 2017, which is a Division of U.S. patent application Ser. No. 14/623,941, filed Feb. 17, 2015, now U.S. Pat. No. 9,351,060, issued May 24, 2016.

FIELD OF THE INVENTION

The present invention relates to the field of consumer electronics entertainment devices, and more particularly to an audio entertainment system and associated methods.

BACKGROUND OF THE INVENTION

Each cited reference is expressly incorporated herein by reference in its entirety.

US20140177680 discloses a communication system including a host transceiver, one or many device transceivers, and a wireless or wired link, in which encoded digital audio data and optionally also other auxiliary data are transmitted and received between the host transceiver and one or many device transceivers. Packets of encoded audio data are wirelessly transmitted from a host using a modulation scheme adaptive to error rate US20140119561 discloses an apparatus that includes an AV receiver with a wireless audio module (WAM) host which wirelessly bidirectionally communicates with plurality of speakers each having a WAM device to enable bi-directional communications with the WAM host and provide automatic configuration, e.g., determining a location for each speaker in order to identify each speaker, setting time delay parameters for each speaker, and setting volume parameters for each speaker.

US20130306399 discloses a customizable modular speaker system, which includes one or more acoustic modules; one or more optional spacer modules coupled to the acoustic modules; and one or more end caps that can be coupled to the acoustic or spacer modules. The modules and endcaps, when assembled, formed a substantially continuous T-slot. The T-slot is capable of engaging a wall mounting cradle which in turn can affix the speaker to a surface with a mounting bracket to create a wall mounted speaker. In other instances, where a shelf or tower speaker is desired, the T-slot engages a spine mounted in a base. The present modular system allows for the same components to be assembled into a bookshelf speaker, a tower speaker, a sound bar, or a wall speaker.

US20070160225 discloses a Bluetooth loudspeaker with a self-configuring network which searches for the other loudspeakers, and which can automatically create a table of mutual visibilities, and, on that, define a hierarchical network topology. One of the loudspeakers is designated as the network head so as to be capable of searching for and setting up a wireless link with a remote peripheral capable of transmitting a coded audio signal (A2DP) and/or a control signal (AVRCP). The other loudspeakers receive audio signals sent to them encapsulated in messages that include routing data, either directly, or after said signals have been relayed via another loudspeaker.

U.S. Pat. No. 8,165,333 discloses a modular speaker system which includes a base assembly having a longitudinally extending, central support member and a support leg extending therefrom in a manner supporting the central support member in a generally upright configuration. The central support member includes a first end and a second end. A first woofer is secured to the base assembly, and a base assembly amplifier is mounted within the central support member and connected to the first woofer. An auxiliary speaker assembly includes a longitudinally extending, auxiliary support member having a first end a second end, the first end being shaped and dimensioned for selective engagement with the second end of the central support member. A first driver is secured to the auxiliary speaker assembly and an amplifier is mounted within the auxiliary support member and is connected to the first driver.

EP2557813 and US20130039527 disclose a system for configuring an audio reproduction system having moving speaker elements, having a processor that receives generates an adapted loudspeaker signal, taking into account the movement.

See also, 20150036859; 20150036858; 20150010189; 20140376758; 20140355806; 20140362995; 20140341413; 20140341390; 20140328506; 120140321658; 20140321653; 20140270695; 20140270324; 20140270306; 20140241558, 20140219489; 20140193024; 20140177680; 20140140519; 20140133674; 20140119561; 20140032806; 20140003619; 20130315429; 20130306399; 20130282386; 20130259283; 20130210525; 20130191553; 20130177198; 20130170684; 20130089217; 20130058022; 20130039527; 20130028457; 20120204213; 20120250924; 20120183158; 20120114151; 20120058727; 20120002356; 20110274286; 20110222720; 20110123054; 20110112664; 20100322445; 20100119078; 20100030563; 20100020999; 20090296964; 20090238384; 20090191911; 20090175216; 20090110216; 20090079705; 20090081948; 20090067640; 20090029745; 20080304692; 20080212971; 20080168312; 20080152164; 20080101638; 20080062251; 20080045140; 20080024686; 20070237337; 20070230723; 20070206827; 20070160225; 20070154041; 20070147644; 20050185801; U.S. Pat. Nos. 8,873,239; 8,839,342; 8,578,081; 8,855,349; 8,554,045; 8,537,543; 8,503,709; 8,483,757; 8,477,953; 8,437,493; 8,385,561; 8,351,638; 8,320,824; 8,315.406; 8,311,254; 8,290,196; 8,275,159; 8,270,651; 8,254,623; 8,250,724; 8,204,260; 8,189,848; 8,189,822; 8,165,333; 8,155,370; 8,150,092; 8,150,085; 8,145,821; 8,126,182; 8,126,159; 8,121,329; 8,098,868; 8,098,856; D651,421; U.S. Pat. Nos. 8,090,130; 8,054,987; D643,020; U.S. Pat. Nos. 7,987,294; 7,961,900; 7,937,109; 7,933,637; 7,929,446; 7,856,256; 7,844,920; 7,831,756; D619,995, U.S. Pat. Nos. 7,653,344; 7,643,855; 7,603,150; D601,546; U.S. Pat. Nos. 7,567,680; 7,489,508; 7,483,538; 7,475,990; 7,469,053; 7,415,290; 7,274,797; 7,269,255; 6,910,548; 6,035,962; each of which is expressly incorporated herein by reference.

When consumers typically purchase an audio speaker based entertainment systems, such as a Bluetooth or Wi-Fi speaker, they are of a fixed size, shape, and static underlying communication and access technology, fixed processing capabilities, with no or little ability or mechanism to change or modify the internal or external parts, drivers, pieces, or frequency response, printed circuit boards, or other technology components outside of a warranty or repair service. They may be designed with such technology as to allow two or more distinct Bluetooth systems to recognize each other and synchronize the simultaneous playback of content, but they are not intended for greater detailed customization or personalization. Additionally, existing systems inherently have a built in obsolescence, because as technology changes, or the consumers listening and communication requirements change, their existing products are unable to be updated, modified, or enhanced, rendering them obsolete, except for any backwards compatible technology.

Further, as consumers more deeply engage technology at home and on the go, there is a need to consolidate and integrate functionality and capabilities into a centralized multifunctional system that is able to scale and grow, learn and anticipate, change and be easily modified for the individual, family, or business/commercial needs, requirements, and environment with intuitive integration, and updatable software, firmware, and systems. Where a typical home or venue may have examples of the following technologies in one or more room throughout a location, such as a stereo, computer speakers connected to the computer, a television sound-bar, a baby monitoring system, a home security and monitoring system, (that may or may not include a remote video or audio monitor), a videoconferencing camera capabilities, a fixed landline phone—perhaps with a room to room intercom system, a music library on a phone, a television, computer monitor showing stored video or still image photographs, a clock radio, lights, a Wi-Fi router, an external hard drive/media storage device, these and other technologies all based upon unrelated technologies, with no controllable and centralized integration and control.

SUMMARY OF THE INVENTION

The present technology provides a modular and customizable (submodular) system which provides, among other functions, audio output as a function of an exemplary module.

A module is a self-contained element of the system that is typically self-contained and environmentally protected. It typically has a set of functionality that permit it to operate somewhat independently, though it may rely on other modules for specific functions.

A submodule is a component of a module, which typically is not itself environmentally protected on all sides, and may rely on other submodules within the module for essentially functionality.

In some cases, a submodule may be functionally complete and protected, but may be considered a submodule due to its intended (but not required) placement in conjunction with other submodules. For example, a battery operated alarm clock faceplate submodule might fall within this category. Likewise, in some cases, a module may require functional support from another module, and or endoskeleton. For example, a subwoofer without electronic driver might fall within this category.

In the context of a speaker system, it may be desired to provide a variety of different type drivers, with different frequency ranges, directionality, efficiency/loudness, sound processing enhancements, as possible differences between modules or submodules. Likewise, a sound system may be built with a plurality of modules which serve different or additive functions, such as the bass, mid range and treble drivers of a 3-way speaker, distributed between two or three modules. In this case, a first type module would include, for example, a bass audio driver submodule, amplifier submodule, crossover/equalization submodule; and communications module, and provide electrical or wireless interconnection to communicate with other modules, and power (e.g., 120 VAC, 12 VDC, 5-6VDC, USB, Power over Ethernet, inductive power coupling, etc.), and may include a rechargeable battery submodule. A second module might include the mid-range and treble driver submodules, electronic and interface submodule, and power submodule, and may also include a rechargeable battery submodule.

Advantageously, each module may include an identification and authentication integrated circuit, which may communicate over a simple and relatively slow serial interface, powerline communication technology, or employ RFID or RF or NFC communication technologies. Typically, one module within a system will be a control module or submodule, and the control would manage module and submodule identification and authentication. However, it is also possible to have distributed and decentralized identification and authentication, or provide such services through a remote server. Additionally, each system is designed to work with and coordinate with other systems.

The controller, in addition to identifying and authenticating individual systems and components, allows users to authorize/de-authorize use of panels, adjust power distribution to panels, self-diagnose parts and panels, identify which parts are not working properly, monitor power consumption, identify power configuration and adjust to optimal levels, manage power from all attached power sources, and shut down unwanted/unneeded elements and other systems.

The controller may be housed in a mandatory control panel, one of which is required for system functionality. The controller may be sealed in a watertight, non-accessible base, or generally accessible for upgrades and enhancements, but may still reside within a environmentally sealable enclosure.

Basic communications between modules or control systems is preferably through Bluetooth 4.0 or wired connections (e.g., 100 Mbit, 1 Gbit, 10 Gbit Ethernet, USB 2.0, USB 3.0, USB 3.1, Thunderbolt (1, 2, 3), HDMI, Lightening), though other licensed or unlicensed radio may be used, such as 802.11a/b/g/n/ac/ad/etc. In some cases, instead of digital communications, audio signals may be communicated as analog modulated waveforms, such as through NTSC whitespace, 900 MHz, 2.4 GHz and 5.4/5.8/5.9 GHz bands. The module may act as an access point, signal amplifier or booster or repeater, or as a multiplexor.

Communications outside a set of modules, such as to a remote server, preferably employ TCP/IP or UDP over IPv4 or IPv6 protocols. Within a set of modules, these same standards may be employed, or other communications protocols as may be appropriate.

Between modules that are mechanically interfaced, there is preferably an electrical connection, that provides at least low voltage power, and digital communications according to a consumer electronics standard, such as Ethernet IEEE-802.3, Token bus/ring IEEE-802.4 802.5, USB 2.0, USB 3.0, 3.1, Lightening interface, Thunderbolt interface, etc. The connectors may be as defined by the specifications, or customized. For example, the electrical contacts between modules may comprise gold plated leaf springs and contact pads. Advantageously, each module has a generally required submodule that includes an electrical interface, power distribution, identification/authentication, and at least a minimum level of control logic.

While modules may come in various shapes and sizes, it is preferred that basic modules conform to a standard form factor of about a 4" cube, with each face of the cube being a removable submodule retained in place by an "exoskeleton", and within the cube a bridging structure called an "endoskeleton". Further, consistent with an emphasis on audio output functionality, the endoskeleton within the cube is preferably designed to accept a speaker driver on at least two faces, preferably four faces, and most preferably six faces (though in most instances, at least one face of the cube will be occupied by a non-speaker submodule or abutted against another module, and thus precluding general occupation of all six available slots for audio drivers. However, the panels affixed to the module may be of any type, including cone speakers, flat panel or electrostatic speakers, control modules, a support for one or more speaker drivers disposed external to the form factor of the module, a panel configured to support sub-panels, radio modules, display and/or projector modules, and the like. For example, the endoskeleton advantageously provides at least 2 cm clearance behind the center of the front face of the panel to accommodate the voice coil and magnet of a cone speaker.

One aspect of the modular quick connect multifunctional communication and entertainment system will be able to identify system panels, submodules, parts, and accessories connected to or associated with a system and communicate and manage system wide requirements automatically and dynamically, and respond and distribute power and signals and processing based upon the requirements of each modular element paired with, plugged into, or attached to either or an exoskeleton or endoskeleton of the system. The system, for example, identifies and manages the data and inputs accessed, signals emanating from and between the panels and submodules, and communicates with and is authorized by the system and controllers. System functionality includes, but is not limited to, access (cloud based, Internet, cellular, WiFi, nodes, sensors, etc.), control, process, store, send, receive, analyze, update, learn, insert, compile, compare, integrate, distribute, power, communicate, dynamically change, phone, signal, radio, respond, anticipate, authenticate, allow, encrypt, recognize, determine environmental conditions, emergencies, and the like.

The system may provide its own user interface, in the form of a module or submodule, which may include a graphic display, projector, audio/speech input and/or output, touchscreen, keyboard, gesture interface, video camera, buttons, or any combination or sub-combination thereof. Alternately or in addition, a smartphone or tablet device may be used to control the system or portions thereof. The modular system may include a processor, such as a quad core ARM v7 processor, with associated memory and peripherals, and execute various standard operating systems such as Linux, Android, iOS, Windows 8, Tizen, PalmOS, or other operating system, with an "app" or software program provided to define the interface. Alternately, an embedded web server in the module can communicate with a browser, e.g., using HTML 5.0, thus eliminating the need for custom software or apps in the smartphone/tablet/control device. If the system is controlled by a separate device, the user interface device may communicate with the system by infrared or optical communications, radio frequency communications, or acoustic or ultrasonic signals.

The system is preferably designed to allow for multiple different technologies to co-exist via incorporation of technologies within an added "Panel", working in conjunction with, or alone, within the power and distribution system within, on, or around the "exoskeleton housings" and or the "endoskeleton internal structure", and the associated processors, or co-processors, and managed by the system software.

Further, consumers of entertainment and communication systems and devices generally do not hear and listen to music the same way, or desire the same type of audio output from their entertainment systems. Additionally, based upon personal, environment, and communicated influences, one may wish to change or modify their entertainment and or communication system to suite different moods, attitudes, locations, etc. Some like to experience something as simple as a more high end audio frequency, such as those associated with treble (tweeter), or midrange, or full spectrum speaker drivers, with some wishing more and deeper bass output, or the chest thumping beat of a subwoofer, and others still want a strobe or other lighting elements and or projectors, or other options accompanying their music and playback.

The system preferably allows consumers to attach such mechanisms to the exoskeleton and endoskeleton, and even to other Panels, to achieve this customizable configuration.

According to one embodiment, at least one submodule of a module comprises a display, such as an electronic paper display, liquid crystal display or organic light emitting diode display, that is visible by a user during normal use. This display is driven by a controller which receives information through a wired or wireless network from a remote server. The remote server provides updates or a stream of static graphics or video to be displayed on the display. A synchronized or unsynchronized audio presentation may accompany the displayed information. The display may include advertisements, which may be of a broadcast (untargeted) nature, or may be targeted to the module or user in proximity to the module. The module may include a human, animal, or like proximity sensor, e.g., a passive infrared sensor or camera, to determine that a person, animal, or the like is nearby, or to identify the person(s) in proximity. The presentation may be interactive, that is, the user may be provided with inputs that are responsive to what is displayed or presented. In the case of advertising, a user subsidy may be accounted for to help defray the cost of the modules and/or content presented through the modules. The accounting may be on a user or module basis, or based on a relationship between the content provider, the server that delivers the content, and the advertiser. Whereas in prior embodiments, an example of a singular cube shape is provided, with Panel attachments with different submodules, e.g., speaker drivers on each side, a further embodiment also provides an additional sleeve element that encompasses the cubes and individual panels, and submodules, and other shapes can fit inside. For example, a housing may be provided in the shape of alphabet letters, where the letters are designed to allow for either individual panels and or submodules, which can be, for example, speaker drivers, lighting elements, or such other functionality as desired to be attached to any facing, plane, or sides of the letter, creating functional speaker letters allowing audio emitting signage and ornamental designs, which can be initials or names of a location in the form of an entertainment system and playback device. Additionally, custom housings may be provided in the shape of logo's, brand identifiers, images, photographs, etc. to accommodate the system panels and accessories in order to further customize and personalize the system. These housings may also allow for other forms of customization including graphic, printing, inserts, to accompany, wrap, or decorate these form factors.

A further embodiment also provides for a "Security Panel", that may contain some stored data, physical material, or protected space, that is released based upon some input, signal, or programming criteria. Additionally, the Security Panel may control access to a location, or information, and may be incorporated into prior embodiments, letters, displays, etc. Such a security panel or submodules incorporating the security features may incorporate contain one or a combination of facial recognition, fingerprint scanner, heat signature detector, voice signature analyzer for security purposes, perhaps utilizing or incorporating cameras, projectors, sensors, LCDs, to gain access to a location, site, or controlled information. These security panels or submodules, may, for example, be incorporated into a display screen, with the panels and submodules arrayed around the display screen, allowing for modular security elements to be customized based upon the depth or control, secrecy, or access associated with material or an individual.

In a cube form factor, typically, the submodules have rigid faces, formed for example of plastic, aluminum or steel (typically perforated), and the exoskeleton advantageously provides a rounded, soft corner which protects the cube module and supporting furniture from damage due to sharp contact. Therefore, the exoskeleton exposed surfaces are preferably formed of a non-brittle plastic or rubber, with sufficient impact absorption capacity to avoid significant damage to the cube for drops of about 1 foot, and to avoid significant marring hardwood surfaces from drops of about 6 inches. The exoskeleton is, for example, a glass fiber reinforced ABS thermoplastic molded in two halves to form a cube scaffold. The endoskeleton serves the function of supporting internal components, such as circuit broads, and may also provide rigidity for the module structure as a whole. The internal connections within a module may be epoxy circuit boards plugged into connectors, flexible circuit boards with printed electronics, or other technologies.

In addition to audio drivers, microphones, displays, cameras, and user interface components, a module may include various sensors, lighting, communications, controllers and processors, the module may include an aroma dispersant system, and other ornamental or functional components, without particular limitation. Because of an intended placement of the module in the center of a living space, the module may include environmental integration, such as a smarthome controller/interface, telephone, remote control for other devices, alarm sensors and interface, etc.

Consumers are also, now more often than not, inclined to use their cell phones for their home, rather than installing traditional "land-lines". With the growing reliance on mobile, portable smart devices, there is also a need for a communication and entertainment systems and devices to facilitate greater communication and interaction with mobile and portable devices as it relates to audio consumption and distribution, and also for replacement of the phone functions such as intercom systems, monitoring systems, be it for audio or video, and for image capturing, be it passive or active, and the ability to access this content and information both locally and remotely.

Certain modular panels, be it a combination of one or more, can be attached to the Endoskeleton and Exoskeleton to allow for the functionality of a combination of speakerphone, camera, video projector, LCD screen, intercom, and the like.

The system may also act as a location safety and monitoring system with built in sensors and monitors that can determine changes in environmental conditions within a room such as excessive or changes (may be predetermined or not) in temperature, heat signatures, noxious gases (carbon monoxide, explosive gasses, thiols), water/moisture, movement, proximity alarms, motion detection, glass breaking etc. The addition of a "Sensor Array Panel" can sense, acting alone or in conjunction with other sensors, remote, or local accessory elements may indicate a programmed environmental condition, be it hazardous or not, and trigger alarms, coordinate or integrate with other existing home security systems, and indicator or point to an egress location in the event of a fire, such as lighting up the window frame of an egress point, or light a path with moldings, or light up the sash or lock area of an door. The System, or combination of Systems and Panels, may allow for the triangulation, identification and pinpointing of individual with a location, the proximity to the origins or locations of an event such as fire or other noxious hazardous conditions, and signal or trigger alarms, and or vocal warnings and responses based upon the situation, or proximity of an individual or person or pet, and instruct required actions, indicate points of egress, instructions, locally and remotely facilitate emergency procedures and notifications, calls, SMS, and other emergency responses. Home integration system functionality advantageously employs Z-Wave or Zigbee communications, and therefore a compatible communication submodule may be included in the system. The proximity sensors can determine movement in/out of a location, such as a child's bedroom, e.g., someone who may be prone to sleepwalking or night terrors, and trigger an alarm, which may include a text message, telephone call, email, HTML message, etc., or for tracking human movements in/out of a room, house, location, based upon permissions such as a curfew, or for use with the elderly location based tracking and indicator source. In general, the module(s) will communicate through a separate internet gateway, the module system may also include a cellular data communication device (e.g., 3G, 4G, LTE, LTE LAA, WiMax, or the like) and therefore be independent of other local infrastructure for external communications.

Other triggers, based upon the sensor array, may turn on or off, clock projection, or light panel startup or dimmer, different channels, audio, video based upon your entrance or exit from a location, and/or may turn the system into stand-by mode, off, or some other status.

Based upon the identification and tracking of individuals within the range of the system, the system is also designed to identify individuals within proximity, determine usage habits, entertainment consumptions, with associated media content, ambient temperatures, during what time of day, communicating what information, using what social media or program or universal resource locator (URL), and learn and extrapolate such data as determined to be of interest to those particular users. Examples of the same would be other entertainment content that like identified users purchase or consume, and offer, via such means as email, text, voice activation via the system, or delivered via a display submodule, the ability for the consumer to purchase, rent, download, try and buy, type experiences. Utilizing such intelligence, the system could adjust, amongst other things, playback, volume, equalize the signals, control lights and dimmers, thermostat, and appliances accordingly.

Embodiments of the technology generally relate to a modular and customizable communication and entertainment system platform, be it for example a wired or wireless audio or visual devices such as, audio/visual speaker systems, headphones, sound bars, networked speakers, phone systems, intercom systems, or the like. The system may also scale to professional or commercial modules, such as DJ systems, club and commercial venue based audio video playback devices, with such professional or commercial modules having different sizes or form factors, as well as functionality, to suit the intended usage. Typically, a professional or commercial module will have more limited general purpose functionality, and will typically rely on wired communications and higher power acoustic outputs. The modules may be placed and controlled as a single location or a multi-location system.

A module or submodule (or set of submodules in combination, that may be spread across a plurality of modules) may provide audio/visual monitoring, which can include passive and/or active sensors. Note that a particular sensor may be used for a variety of purposes, by different applications within or external to the system. According to one embodiment, low data rate sensors such as toxic gas sensors, illumination sensors, or passive infrared movement sensors may stream their output periodically through a data bus, which can then be captured by hardware or software elements which monitor the bus, or respond to polling. On the other hand, high data rate sensors, such as video or audio information, may buffer the output stream, and respond to polling to transfer the buffer contents, or selectively stream the audio or video when enabled. Indeed, high data rate or real time data may employ a different data bus architecture than low data rate devices. Thus, for example, different network architectures may be provided which are deterministic on one hand, such as a centrally controlled or a token passing network, and a statistical collision sense/multiple access on the other. The deterministic network architecture is better suited to real time conveyance of datastreams that tend to saturate network capacity, while statistical access control is better suited to bursty data that is tolerant of variable latency.

According to one embodiment, suitable sensors and control software and algorithms are provided to implement baby room monitoring, "nanny-cam" type monitoring, parental or child's room or location protection/zone monitoring, work place monitoring, and remote monitoring.

The system and method is preferably made up of different replaceable and reconfigurable/self-configurable modular functional elements/parts that connect and work together to form this hardware, software, and updateable system. The system is modular in nature, and in general, permits any mechanically compatible submodule to be placed in any location within a module or network of modules forming the system, such that the submodule informs the controller(s) of its presence and identity, authenticates itself as may be necessary or appropriate according to usage or protocol, and the system automatically configures itself to permit the submodule to operate and interoperate with the other submodules. Likewise, a module (which typically contains one or more submodules) can also be added to or removed from the system in an ad hoc manner, with the other modules and submodules reconfiguring as necessary to support the system change.

In some cases, a module or submodule is necessary, and therefore system operation ceases when that module is removed. For example, in a system that has a single controller, removal of the controller would prevent any intelligence of the system, and therefore it would cease to operate, except as permitted as a regular speaker, if analog connections are available. In other cases, when a module or submodule is added, there is some redundancy in the system. For example, an added module may include a controller which has redundant features with a controller already preexisting in the system. In this case, the two controllers identify each other, and a hierarchical rule may be applied to use the more capable controller as the primary controller, with the less capable controller relegated to operation as a backup and slave device. In some cases, the multiple controllers may interoperate as a coproccessing or parallel processing network, to provide enhanced capabilities. Where two identical controllers are present, these may be selected based on an arbitrary but predictable criterion, such as lower serial number, signal strength, power consumption optimization, etc. Another option is to provide redundant and failsafe operation of both controllers at the same time. In power (e.g., battery) or power dissipation constrained applications, one controller may be deactivated completely and placed in a standby, hibernation or deactivated mode, or only certain aspects and functions of the control may be utilized.

In the case of audio drivers, the system may enter an adaptive mode to determine the sound environment in which each submodule is operating. This adaptive mode may include a specific equalization mode in which special signals are emitted, or apply adaptive updating based on normal sounds emitted through the system and detected by a microphone or microphone array. In some embodiments, the location of each module may be determined, such as by RFID localization and triangulation, or use of GPS or assisted GPS technology (e.g., GPS satellite plus time difference of arrival [TDOA] to a base station). In a typical system, the user will seek to implement a bilaterally symmetric set of acoustic drivers. However, for a variety of reasons, the resulting system may be or become asymmetric, based on room shape and size, occupancy, different modules and module characteristics, and the like. The controller may implement a psychoacoustic model seeking to optimize the actual sound produced in the environment for the listeners in that environment, on a continual basis. In some cases, the content, which may be music, is mixed by the producer contemplating a particular presentation environment. This may differ for each work. To supplement the local optimization, the work itself may be identified, and the controller query a remote server to determine optimal parameters for presentation of the work, which can then tune the local controller for best results. For example, the controller can control equalization for each driver, delay and echo (with separate equalization for the echo), phase and phase relationships with other drivers, resonance compensation, and in some cases, directional vectors. In some embodiments, the acoustic output is optimized for a single listener in the environment, and may compensate for movements of the listener in the environment during presentation. In a video playback mode, the system may also control synchronization of sounds with screen action.

According to one embodiment, the modules, and to a lesser extent submodules, employ quick-connect technologies to permit mechanical and electronic reconfiguration without tools or special skill. For example, simple mechanical latches, detachable hinges, magnets, and the like may be used to form reliable mechanical and electrical connections during normal operation, yet permit easy alteration as desired by a user. The modules, submodules, and the quick-connect technologies, alone or together may contain a locking mechanism allowing for a more secure attachment, or security control provision for the different elements.

The controller may receive a variety of user control signals, including button and touchscreen (resistive, capacitive, acoustic, optical, etc.) presses, audio and speech recognition, video and gesture recognition, digital communication from infrared remote controls, Bluetooth, WiFi, Zigbee, ZWave, NFC/RFID communications, and the like. The controller may implement direct control through dedicated inputs, a set of predetermined menus, a hypertext defied set of menus, or an adaptive system for user control. The control system preferably employs machine learning of user preferences, distastes, habits, and patterns. The controller may execute applications, similar to those intended for smartphones, which are downloadable through a communication network, and/or may interface with the user through HTML5 or the like. Indeed, the controller may be a smartphone, either embedded into a module, or provided through a wired or wireless connection of a standard smartphone, such as Apple iPhone, Android 4.X, or 5.X, Windows 8.1 or 10, Blackberry, Linux, or the like. The controller may also be similar to a Raspberry Pi, or other single board computer based on the ARM RISC technologies, Intel x86/x64 technologies, or MIPS technologies, for example. In some cases, one or more modules may require a high level of computing performance, to provide the features, for example, of Apple TV, TiVo DVR, or more generally a desktop operating system (Windows/Apple/Linux), workstation, or gaming system. In such cases, an entire module may be dedicated to such usage, and may forego internal modularity distinct from the standard set of computing modules used by such systems (DIMM, SATA, USB 2, USB3, wired Ethernet, thunderbolt, HDMI, DVI, ⅛ " audio, SD card, etc.).

Another embodiment provides for use of the system alone, in conjunction with, or accessory to a gaming system such as a Microsoft X-Box, Sony Playstation, or Nintendo Wii system, for example. Incorporation into such systems as a massively online gaming system, or for individual or local consumption and use, with and incorporating such panels as video, lights, audio, projectors, working as an independent accessory, or with full integration with gaming panels designed for deep integration. Such Panels may offer multiple functional elements such as access to capabilities, functions, tools, weapons, instructions, help and assistance, protection, etc. In it noted that one module may incorporate or interface to a full Microsoft Kinect or Kinect 2 sensor system or the functions thereof, see. e.g., en.wikipedia.org/wiki/Kinect.

Another embodiment is use of the system alone, in conjunction with, or accessory to a Gambling system, where an individual can access, be authenticated, identified, and securely sign-into a gambling site, make wagers, remotely participate in group gaming, interact with a dealer, other players, within a site or network. Gaming Panels may allow for particular security or location protocols, or allow for specific Gaming elements, or updateable with software and firmware to purchase, acquire, or access different feeds or functions.

Another embodiment is use of the system alone, in conjunction with, or accessory to a remote school/university learning and testing system. Such a system and associated modules could utilize Security Panels to authenticate an individual or student, monitor signals and access and use of the internet, cell and other signal processing sources, and restrict the same during teaching and testing scenarios. A secure video camera and microphone system in a module may be used to monitor a student during testing. A secure browser may be implemented to restrict access to unauthorized web sites and to unauthorized functions during testing.

Another embodiment is the use of the system alone, in conjunction with, or as an accessory to a patient medical monitoring, remote caregiver monitoring, doctor interface or diagnostic system, emergency response system via different functional Medical Interface Panels. Such panels may act alone, or in conjunction with, other intelligent devices or smartwear. Such devices include patient monitoring devices and sensor embedded in clothing, braces, shoes, attached external monitors, in addition to such items as smartwatches and bands, eyewear, monitoring accessories. Identifying and coordinating multiple inputs within, on, or around the systems, and triggering appropriate responses. Such panels or submodules may include specific medical sensor arrays that detect and monitor such activities, as respiration, heart, pulse, pressure, moisture, humidity, time, elongation, stress, glucose/Ph, wear, resistance, motion, temperature, sleep detectors, impact, rotation, flexibility, and perspiration. The panels can contain or interface with such intelligent devices or smart apparel, and trigger functions contained therein, or accessories attached to a patient, such as a defibrillator, IV systems, airbags, transdermal delivery systems, stimulators, vibrators, heat delivery and controls, cold delivery and controls, liquid and gas dispensers, etc.

While this disclosure generally refers to modular speakers within an entertainment and communication system, aspects of the modular system may include 1) the different types, shape, and sizes of the "exoskeletons housings", 2) type, shape, and sizes of modular "endoskeletons internal structures" within a "exoskeleton housing", 3) the type, shape, and size, and functional elements of the identification, control, and distribution circuitry that fits modularly within, on, or around or in conjunction with either or the "endoskeleton internal structures" designed into, for example, the printed circuit boards "PCB's" or the like control mechanism, and or 4) type, shape, and sizes of the modular "Panels" that attach to, or are in proximity with, and specifically designed functional elements contained therein or on, and 5) the accessories that attach thereto, and 6) the software system and functions that controls the entertainment and communication system, for the identified, recognized, authenticated, and decrypted elements of this system.

Embodiments of the invention may include specially designed modular exoskeleton housing designs of different shapes, sizes, and materials or combination thereof, to which panels such as a speaker(s) and/or accessories, may be attached. A modular endoskeleton (internal structure) is preferably provided that fits inside of, contained within and conforms to the different size exoskeleton housing, and panels. Preferably, a module includes a command, control and power distribution module, which controls the speakers and/or accessories and interfaces. The control module may also be provided in a separate housing, and communicate electrically with the module through electrical connector(s). The control, in turn, may be self-sufficient, or operate in conjunction with other controls which may be within the same system, part of an external infrastructure, in the Internet or within a public or private cloud, which may be local or remote with respect to the module. The control may execute software, to provide data capture and analysis, validation, programming, downloading and uploading, playback, viewing, tracking, activations, social connectivity, sharing, and distribution, and a feedback mechanism for consumer, commercial, and industrial applications.

It is therefore an object to provide a modular speaker system, comprising: an exoskeleton, configured to mechanically support and quick attach and release at least one functional panel; a corresponding electrical interface provided within the exoskeleton for each respective functional panel, configured to mate with a corresponding electrical connector of each respective functional panel; and an electrical bus electrically connected to the electrical interface, and configured to communicate signals through the electrical interface from each corresponding electrical connector to at least one of a signal source and a signal sink.

It is also an object to provide a method of operating a modular audio system, comprising: providing an exoskeleton, configured to mechanically support and quick attach and release at least one functional panel, the at least one functional panel having at least one audio transducer; communicating through a corresponding electrical interface provided within the exoskeleton for each respective functional panel, mating with a corresponding electrical connector of each respective functional panel; and communicating signals through an electrical bus electrically connected to the electrical interface, from each corresponding electrical connector to at least one of a signal source and a signal sink.

The electrical interface may provide regulated electrical power to operate the at least one functional panel. The electrical interface may communicate an analog signal, a point-to-point digital communication signal, and/or a digital packet data network communication signal, for example. The electrical interface may provide regulated electrical power to operate the at least one functional panel. The electrical interface may communicate power, and both a digital signal and a corresponding analog signal.

The system may further comprise the at least one functional module, the at least one functional module comprising an acoustic speaker. The modular speaker system may further comprise an audio amplifier configured to power the speaker. The at least one functional speaker module may comprise a digital memory storing at least one of an audio profile and an identifier associated with an audio profile accessible through the electrical interface, further comprising an automated processor configured to read the digital memory, and produce a control signal for the at least one functional speaker module selectively dependent on the audio profile.

The system may further comprise an automated digital processor, configured to receive a digital audio signal, read a respective audio configuration profile or identifier of a respective audio configuration profile from a memory within each of at least two functional speaker modules, and optimally control each of the at least two functional speaker modules in dependence on at least the received digital audio signal and each of the respective audio configuration profiles.

The exoskeleton may have a rectangular prismatic form factor, and may be configured to support, e.g., at least four functional panels, and being configured to interface with a power supply through the electrical interface.

The at least one functional module may comprise an acoustic speaker and a memory storing at least one of a stored audio profile and an identifier of a stored audio profile, further comprising retrieving the stored audio profile, and converting a digital audio signal into a power analog audio signal to operate the acoustic speaker, in dependence on the stored audio profile.

The at least one functional module may comprise a plurality of acoustic speakers and a plurality of memories storing at least one of a stored audio profile and an identifier of a stored audio profile for each respective acoustic speaker, further comprising retrieving the stored audio profiles, and converting a digital audio signal into a power analog audio signal to operate each respective acoustic speaker, in dependence on the stored audio profiles.

The exoskeleton may have a rectangular prismatic form factor, and be configured to support at least four functional panels, the method further comprising supplying power from the exoskeleton to the at least four functional panels through the electrical interface.

It is a further object to provide a method for operating a modular speaker system having interchangeable acoustic speaker elements each having respectively different acoustic emission properties selected from the group consisting of frequency equalization and directionality characteristics, comprising: attaching at least one interchangeable acoustic speaker element to a base, the at least one interchangeable acoustic speaker element having a memory shoring at least one of a profile representing characteristics of the respective interchangeable acoustic speaker element, and information locating a profile representing characteristics of the respective interchangeable acoustic speaker element; reading the profile representing characteristics of each respective interchangeable acoustic speaker element by an automated digital processor; and selectively generating a set of respective interchangeable acoustic speaker element control signals by the automated digital processor, selectively in dependence on the profile representing characteristics of each respective interchangeable acoustic speaker element and acoustic source data.

The at least one interchangeable acoustic speaker element may comprise at least two interchangeable acoustic speaker elements having differing frequency response, and wherein the automated digital processor selectively controls the at least two interchangeable acoustic speaker elements to provide an equalized composite frequency response, or differing directional acoustic emissions, and wherein the automated digital processor selectively controls the at least two interchangeable acoustic speaker elements to provide an optimized composite acoustic emission.

DETAILED DESCRIPTION OF THE PREFERRED EMBODIMENTS

Figure 1:
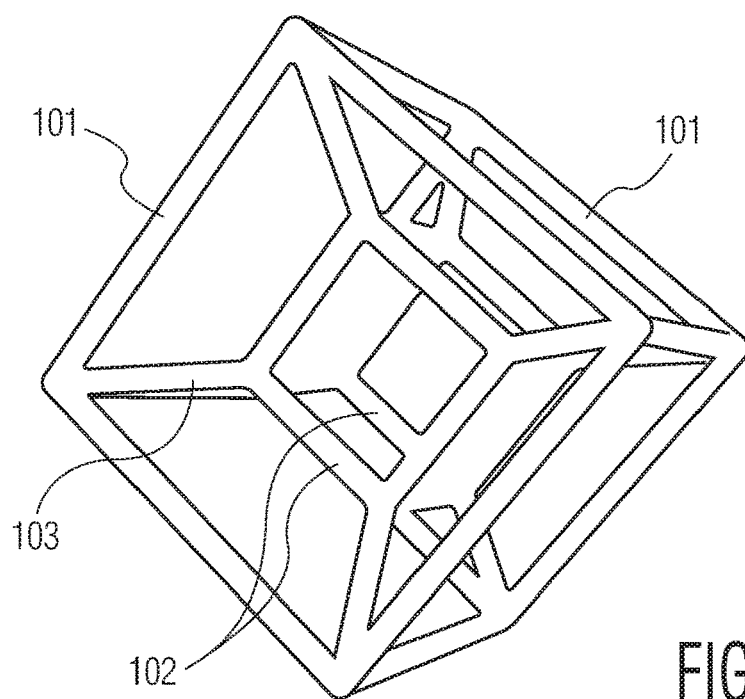
FIG. 1 shows a perspective view of an exoskeleton and endoskeleton structure.

Embodiments of the invention provide, according to one embodiment, a modular quick connect multifunctional communication and entertainment platform. This system is customizable in a variety of ways and adaptable for a variety of uses. For example, certain embodiments allow a user to customize their listening experience with modular speaker driver panels such as a tweeter, midrange, woofer, subwoofer, active and passive radiators, in a multitude of different shapes, sizes, and formats all with quick connect interchangeable parts that allow for a personalized audio/ visual system. In certain embodiments, one can achieve multiple layers of drivers on a single facing of an available plane where one can have a first attached larger bass driver panel, with the option of placing another smaller panel attachment containing a mid-range panel, or the like, over, behind, or around the facing of the panel already attached to the housing, thus creating a multi-tiered approach. In others, one can attach another device, a light element for example, that can be its own panel, or can work in conjunction with an existing panel, and be controlled in conjunction with the existing panel, or separately, or timed to synch with, all controllable options.

A single system panel, may itself be modular, such that the facing may be made up of multiple elements that fit together, and may be preconfigured, or may be designed such that the user can pick and choose the different functional or aesthetic elements that they wish to make up the panel. Where a square face is used, the square may be made up of 4 equal parts, where each subpart is a different driver type (tweeter, woofer, midrange, full range, etc.) that are also modularly attachable to each other, and then to the exoskeleton housing unit and or the endoskeleton internal structure. Alternatively, each part may encompass a light (illuminator), camera, projector, and/or storage, allowing a single panel to record audio and video still images or moving video, record the content locally or via the network remotely, project the content upon a surface, and have that panel interface with other capabilities of the system for which it is attached.

Whereas some embodiments establish external Panel configurations, and an ability to layer a multitude of drivers, electronics, and accessories to the exoskeleton and endoskeleton, in other embodiments, the endoskeleton will facilitate pull out and fold out driver and electronic elements, such that when deployed, these elements extend beyond the protected and contracted state of a closed module. Such designs include, but are not limited to, a draw pull out, which, when extended, includes a panel that unfolds, can lift and pivot, presenting either one or multiple devices such as speaker drivers, LCD, LED or the like, or display panels, touch screens, or monitors, or screens, light elements, antenna array, sensor arrays, etc.

An exoskeleton or housing may contain a fixed or preconfiguration of product pull-out, or may be modular in nature allowing a user to insert multiple drawers with different functional elements, that operate one way when not extended, versus another when fully extended and all internal elements unfolded.

An additional embodiment allows for other types of plug-in products with connection/input mechanisms and enhancement capabilities. Such power plug type items would contain or communicate and be authorized to work with, power or be powered, authorize or be authorized, and control or be controlled via an interface mechanism, or add other functionality to the system such as an inline power, amplifier, repeater, connector, surge protector, microphone array, of the like, where the plug-in may not contain the full structure of a typical panel, but may allow for a subset plug-in capabilities into an existing panel or into the exoskeleton or endoskeleton.

Certain housings may have a fixed set of panels and or function, which may be modularly added to other sets of housings. Some housing may act solely as a communication hub, supporting, for example, WiFi, Bluetooth, internet access/routing, cloud based computing, as a computer or like processor, a dedicated speaker driver, etc.

Certain panels may contain plug-in ports, in any one or combination of such as Ethernet (RJ45, 8P8C), USB, HDMI, micro USB, 3.5 mm audio ports, digital audio input, Firewire (IEEE-1394), cable jacks, phone jacks, ac/dc power ports, wired speaker ports, sensor arrays, microphones, processors, co-processors, power, detectors, SD or micro SD cards, storage, antennas, etc.

Given the personalization and customization desires of consumers, the system facilitates greater customization via different size and shape exoskeletons and endoskeleton configurations in the forms of letters of the alphabets in any language, logos, brand identity, products, and custom design configurations. Various panels, containing all manners of capabilities, such as speaker drivers, electronics, or accessories, designed for the system, fit in on or around these letters or shapes. For example, an "A" shape enclosure may be designed to hold some number of panels, for example 7, with 3 on each leg of the A, and one on the bridge, allowing the consumer to pick a letter, initials, or a full name of a person, place, or thing, and incorporate all technologies and capabilities into the chosen letters.

Further, the letters or shapes may have different capabilities for sitting on a surface, hanging on a wall, or being suspended from an object, ceiling, or the like. These letters or shapes may be water proof, and made of a variety of materials, and may attach together, or be operated separately, or may be powered together or alone, and may be controlled by the same program if desired. They may be stackable, or attachable to one another, and there may be different forms of a platform or case that holds the letters, and the said platform or case may offer some additional functional element in support of the system, including, but not limited to, power, signal, processing, etc. The letters or shapes advantageously are used as commercial signage, and may be used to present advertising content to passers-by, mood music, or the like.

The system may also allow for the option to capture, stream, view, protect, project, or monitor visual or video data, as still or motion images, with built in or modular add-on video accessories within on or around the system. Other embodiments may also facilitate room to room or location to location audio-visual communications (e.g., video conferencing), intercom type systems, and audio visual monitoring.

Embodiments of the modular quick connect audio/visual system can be used in conjunction with an audio and/or video source to output AV signals. Examples of audio sources may include, but are not limited to, digital media players, smartphones, computing devices, tablets, e-readers, televisions, set-top boxes. CD players, or other similar devices. The modular quick connect⁻ system allows the user to create their own personalized driver configuration, made up to include a single driver or a combination of driven including, for example tweeters, midrange, bass, woofers, subwoofers, active and passive radiators, transducers, etc. Each of these available drivers is configured in a modular quick connect form, and configured to fit inside a host of housing shapes and sizes. A user can start with a single speaker/driver, and add or modify speaker/drivers over time, based upon available budgets, changes in sound preferences, or the user's environment. A driver's modular quick connect form accomplish several tasks including the ability for the quick connect mechanisms to facilitate the pathways for all required signal distribution through-out the ecosystem, but also ensure module to module connectivity, stability, and accessory modularity so that standards allow for a plug and play technology. Additionally, the quick connect mechanisms may include the ability to facilitate and implement quick connect protocols and communications.

FIG. 1 depicts an illustrative embodiment of a configuration of the modular quick-connect system. A cube shaped quick connect housing unit holds up to six (6) different modular. walls (four around, and top and bottom). Each side of the housing or modular wall can be configured with a selected modular component. Typically, the lower face will be occupied by a power entry module with basic user interface elements, such as an on-off switch, master volume, mute, and the like. The base may also provide a supporting platform somewhat larger than the cubic faces, to provide stability in case of extended height. Likewise, the top face may be occupied by an inter-module connector element, facilitating stacking of cubes. The inter-module connector element provides mechanical and electrical interconnection of the modules, and may also house other components, including sensors, controllers, lighting, etc. The inter-module connector element may permit adjacent cubic modules to abut each other, or have an arbitrary distance between them. According to one embodiment, a non-directional driver, such as a subwoofer, is housed in a base panel, along with its associated amplifier, which may consume more power than other types of modules. A passive radiator element may be provided in an upper panel. According to some embodiments, the inter-module connector element provides a cylindrical pole that spaces the modules by an arbitrary distance.

The four side faces may, for example, be occupied by various panels. Preferably, each side is configured to house a selected, specific driver type with an easy click or stick together attachment mechanism so that up to six different driver types may be employed with the cubed body. By way of illustration, the four side modular wails can be configured with 1 tweeter, 1 midrange, and 2 bass units.

In keeping with the modular design, a user may start with a single speaker: driver, and add or modify speakers/drivers over time, based upon available budgets, changes in sound preferences, or the user's environment, or enhancements to the technology. If a user seeks more midrange output, then the user simply adds or swaps a side, two, or three with more midrange drivers.

A "brain panel" may be provided, which advantageously integrates a graphic user interface, audio and video interfaces with a programmable processor. While controllers may be embedded within a module and not occupy an external face, in many cases, the integration of an externally exposed user interface with a controller is efficient.

In some cases, a panel, i.e., a faceplate for a cubic (or other shape) exoskeleton, is subdivided into multiple subplates. Architecturally, a frame is preferably provided which mates to the exoskeleton, and provides electrical connection, mechanical support and quick release features. The subpanels, which may be, for example one quarter of a panel size (i.e., 2 inches square for a four-inch panel) may each have separate functions, though these may be redundant, such as tweeters.

As shown in FIG. 1, a cubic wire frame exoskeleton 101 is provided, which supports an internal exoskeleton 102 through linkages 103. The pyramidal recess in the exoskeleton 101 extending to the endoskeleton 102 to accommodate a speaker cone. The linages 103 may be used as supports for circuit boards, and the like.

Advantageously, the exoskeleton has a set of magnets (or magnetically permeable material) at each corner, for each face. The panels or sub-panel mount has a corresponding set of magnets (or magnetically permeable material) at each corner, such that when a panel is proximate to its home position, the magnets automatically center and hold the panel in place. An electrical connector is provided for each panel or faceplate element.

A variety of quick connect technologies are available to connect panels to modules, and modules to each other or interconnection plates. For example, attachment may be secured by a bayonet type socket (e.g., providing a suitable configuration on a ring attached to the exoskeleton and the aperture 604), cotter pins or other types of pins, statistical fasteners (e.g., Velcro®), latches, hooks, snaps, retractable-member linkages (e.g., parallelogram linkage, rack and pinion, radial retraction, etc.), screws or bolts (these can be quick release, depending on the thread design, or can be internally motorized), or other known means. In some cases, a panel or subpanel may be permanently attached or attached through a non-quick-release technology. For example, where a panel or another module has non-generic modular connections made to the module, another panel, another module, or the like, it may be preferred to prevent quick release of the panel or module to avoid interrupting persistent and non-modular internal elements.

For example, the connector may be electrically compliant with USB 2.0, USB 3.0, or USB 3.1, with each module capable of acting as master or slave (auto sensing). USB 3.1 provides the advantage of higher power capability (~15W, 5V @ 3A), and higher data rates, though it consumes more power. A USB hub device is provided within the exoskeleton, to arbitrate and propagate signals within and across modules. Of course, other communications schemes may be employed.

Figure 2:
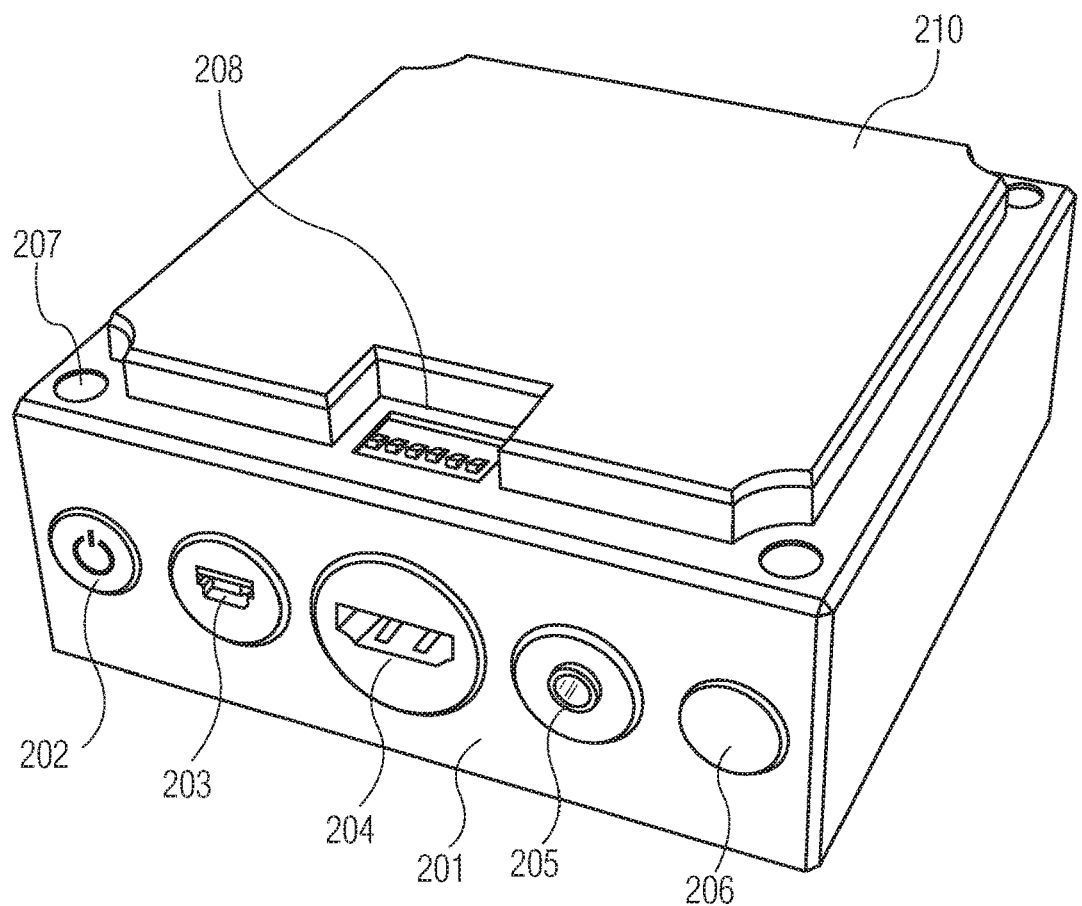
FIG. 2 shows a perspective view of a base module, controlling power for other modules, providing external data and audiovisual interfaces, and having an electrical connector which interfaces with another module, according to a first embodiment.

FIG. 2 shows a base module 201, which provides power, audio visual control, and electrical interfaces for an entertainment system. The based 201 provide an on-off switch 202, USB 2.0, 3.0, or 3.1 interface 203, HDMI and/or eSATA interface 204, 3.5 mm audio plug analog interface, and a software programmable button interface 206. The top surface 210 of the base module 201 sits under the exoskeleton 101, and is attached through a set of magnets 207 provided in the corners. An electrical connector 208 links to an electrical bus of an adjacent module, and in the case of the base, supplies power to other modules. As shown in FIG. 2, the base includes the HDMI and/or eSATA interface 204 typically provides a higher data rate than is available through the electrical connector 208, and therefore an audio visual controller is contained within the base module 201 to generate the HDMI signals. The base module may include various radio transceivers, such as IEE-802.11ac, and therefore internal or external antennas (not shown) may be provided.

Figure 3:
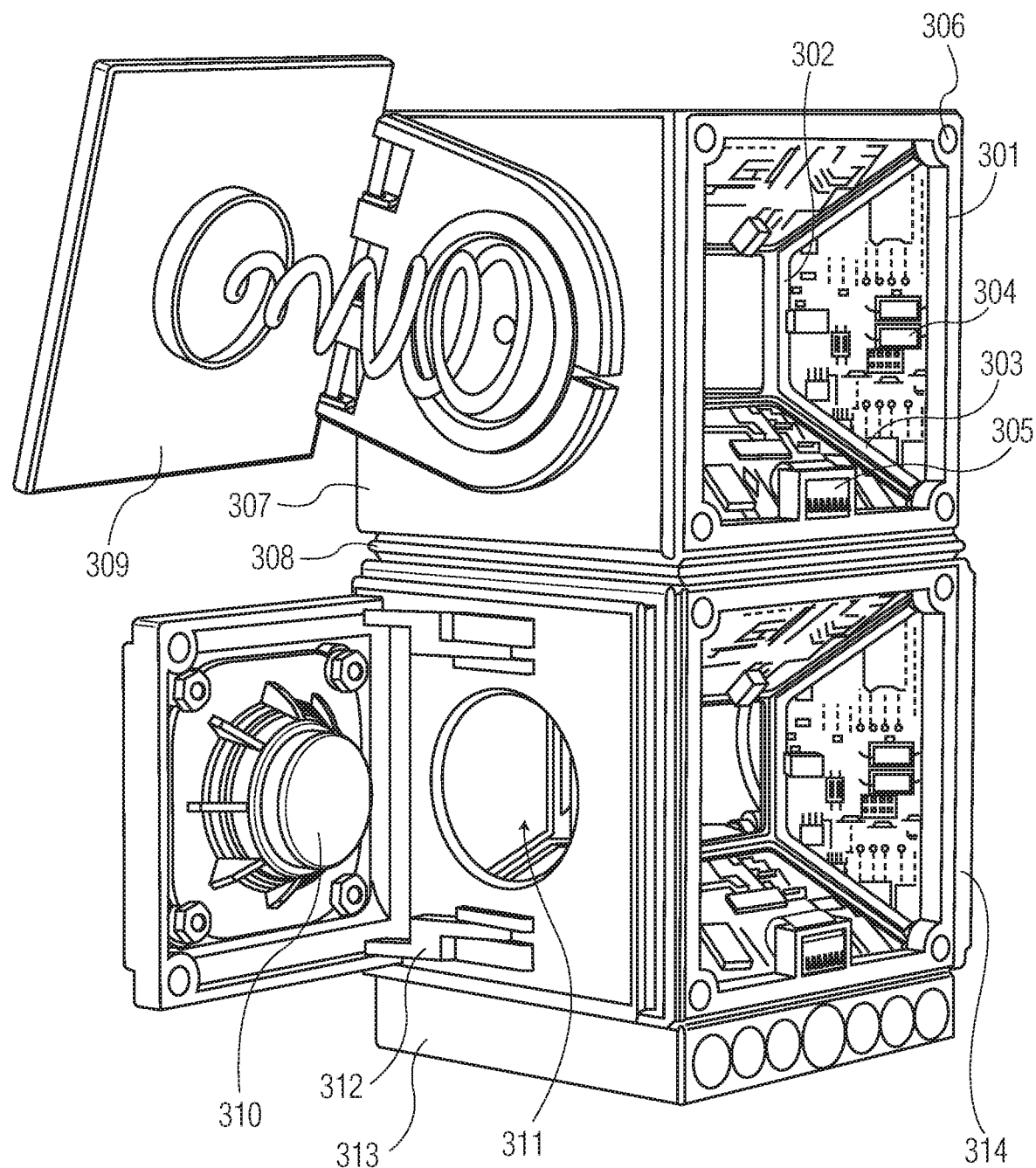
FIG. 3 shows a perspective view of an assembled set of modules, showing a base module providing a power supply, a lower module having an articulated cone speaker, and an upper module having an articulated flat panel speaker, according to the first embodiment.

FIG. 3 shows a set of three interconnected modules. A base module 313, similar to the base module 201, provides power and control. The base module 313 is mechanically and electrically connected to a lower module 314, which supports an articulated cone speaker 310 module having hinged support 312. The articulated cone speaker 310 can fold back into the module with a rear magnet of the articulated cone speaker 310 extending into aperture 311. An interface panel 308 connects the upper module 307 to the lower module 313. The upper module supports an articulated flat panel speaker 309. The internal details of the upper module 307 and lower module 313 are similar. The exoskeleton 301 has a set of corner magnets 306 on each corner, e.g., 24 in total. Bridging between the endoskeleton 302 and exoskeleton 301, bounded by the bridging members 303 are a set of circuit boards 304, which are modular, i.e., can be replaced to provide different functionality. For example, a circuit board may be a class "D" amplifier, using power supplied by the base module 313 to power the analog signal that powers the speaker. An electrical interface 305 is provided on each face of the upper module 307.

Figure 4:
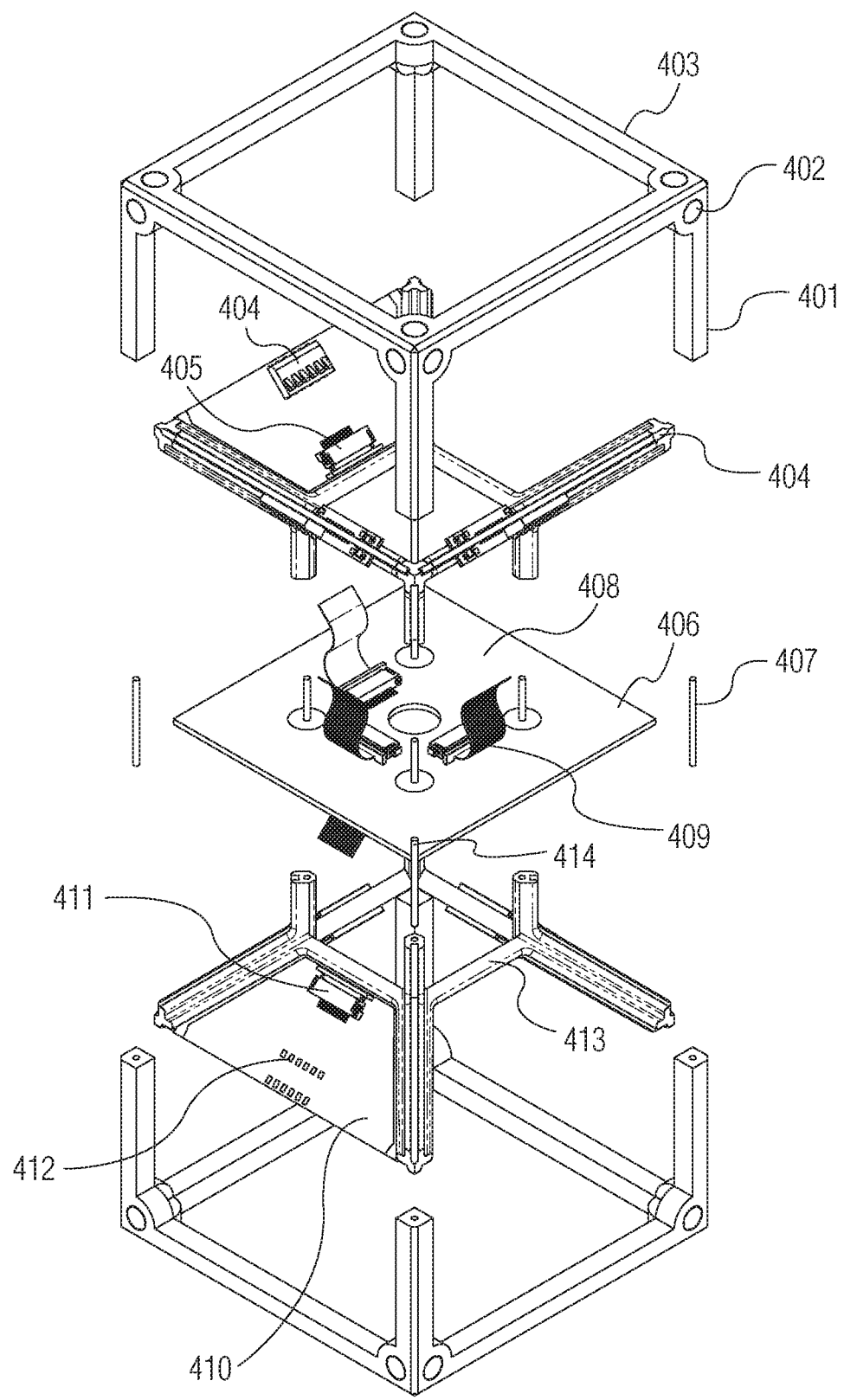
FIG. 4 shows an exploded view of the exoskeleton and endoskeleton structure, including circuit boards and electrical connectors, according to a second embodiment.

FIG. 4 shows an exploded view of a second embodiment, which differs from the first embodiment principally in the placement of the electrical interface 404 (rear side 412 shown), which in the second embodiment is located on the circuit board 410 and not the exoskeleton 403. Similar to the first embodiment, the exoskeleton 403 has a set of corner magnets to attach panels in a quick-release fashion. The endoskeleton 413 is connected to the exoskeleton 403 through bridging members 404. Each circuit board 410 has a connector 411 that links to a corresponding connector 405 on the endoskeleton 413. The endoskeleton 413 corresponding connector is in turn connected to a central circuit board 406 through a ribbon connector 409. The exoskeleton 403 is provided as two parts, each with a half-length member 401 that are connected together with a pin 407. Likewise, the endoskeleton 413 is provided as two parts, each with a half-length member that are connected together with a pin 414, which penetrate through the central circuit board 406.

Figure 5:
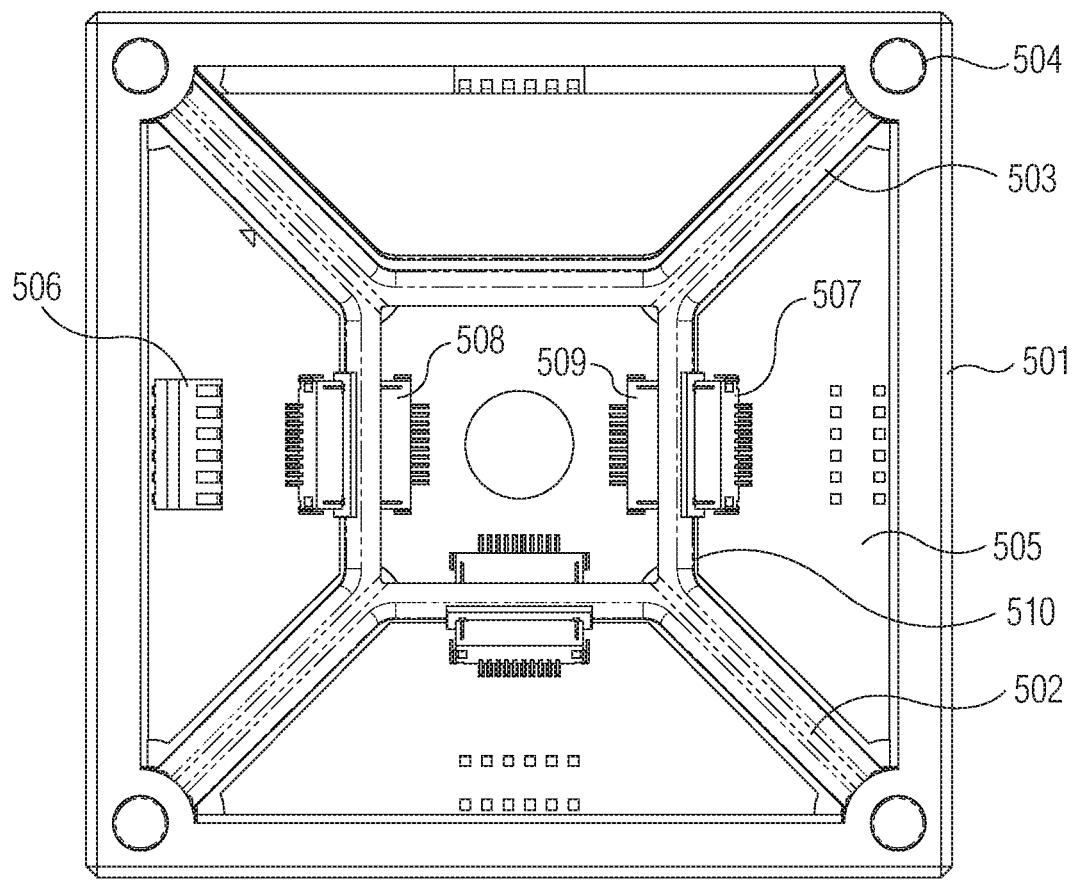
FIG. 5 shows a top view of the exoskeleton and endoskeleton structure, including circuit boards and electrical connectors, according to the second embodiment.

FIG. 5 shows a top view of the module according to the second embodiment. The exoskeleton 501, bridging members 503 and endoskeleton 510 support a set of circuit boards 505, which in turn support electrical interfaces 506 to external modules (not shown) and connecting through connector 507 and corresponding connector 509 to the central circuit board 508. Set of corner magnets 504 are provided to attach panels to the module. The magnets are typically rare earth (e.g., samarium-cobalt).

Figure 6:
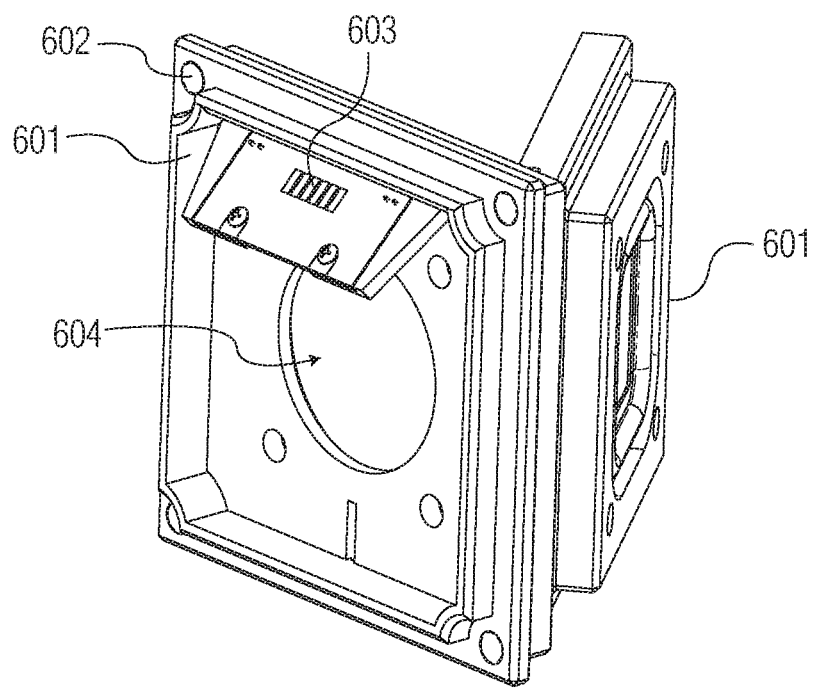
FIG. 6 shows a rear perspective view of an articulated speaker panel for attachment to the exoskeleton and endoskeleton structure according to the second embodiment.

FIG. 6 shows a speaker panel 601 suitable for attachment to the exoskeleton according to the second embodiment. In particular, the panel 601 has an electrical connector 603 configured to interface with the electrical interface 506. Each panel has a corresponding set of corner magnets 602 poled so as to be attached to the corner magnets 504 of the module. The corresponding set of corner magnets 602 are typically rare earth. The speaker panel 601 has an aperture 604 to allow a rear-extending cone and magnet assembly of a speaker to fold into the module, and thus retract to a cube.

Figure 7:
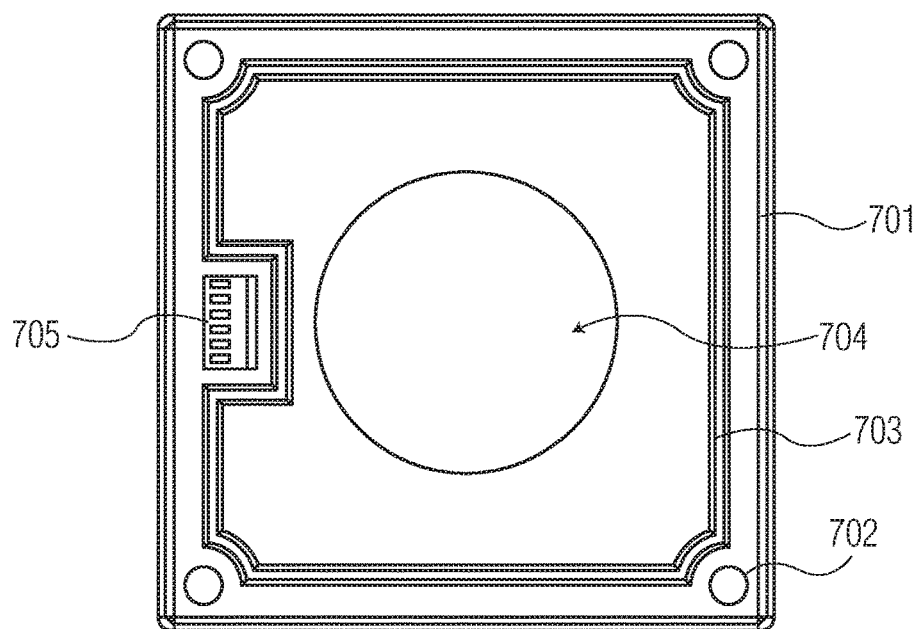
FIGS. 7-9 show a rear, side and perspective view, respectively, of a panel for attachment to a module according to the first embodiment.
Figure 8:
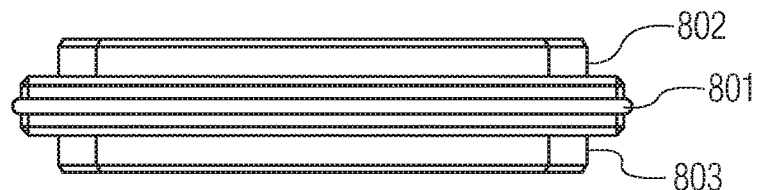
Figure 9:
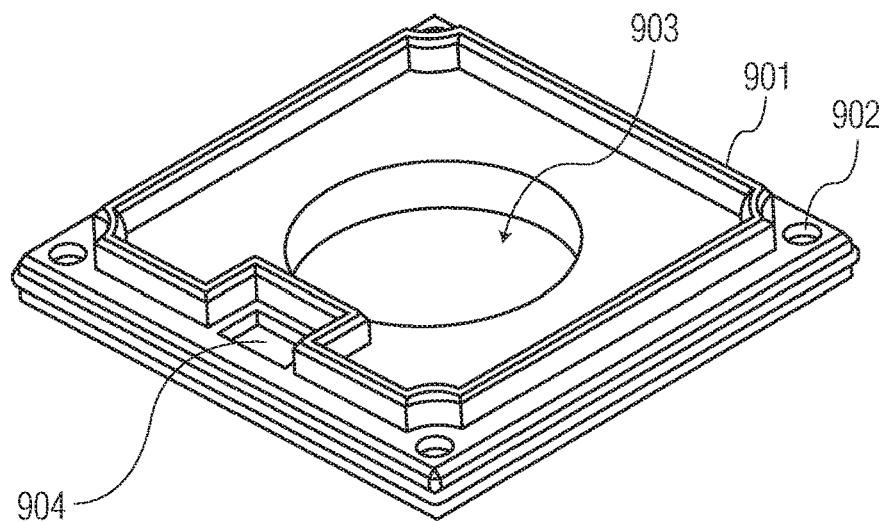

FIGS. 7, 8 and 9 show a top, side and perspective view of the interface panel 308 of the first embodiment. The interface panel 701, 801 has an aperture 704, 903 that permits wiring, sound, and the like to pass between modules. A ridge 802, 803, 901, that centers the interface panel within the two modules connected to it, by attraction of the corner magnets 702, 902. An electrical interface 705, 904 provides electrical connections between the modules.

Alternately, panels may be networked through a local Ethernet type system. For example, each panel may be provided with an RJ45 plug or 8P8C plug, to a corresponding jack attached to the exoskeleton or circuitry within. A Power over Ethernet (PoE) system may be used to power the panels, which according to IEEE 802.3at-2009 (PoE Plus), permits 25.5 W per port. In this case, each module comprises an Ethernet switch or router, with PoE functionality. It is noted that, if more power is required, a cable having more conductors may be used, a second RJ45 connector may be used, or a separate power source may be provided. In general, if four panels are each powered by 25W, that results in a cube module capable of emitting 100W, with higher peaks if a battery, capacitor or inductor is used to store power. Within a four-inch form factor, such power density may be near the acceptable thermal power dissipation limits for consumer electronics.

According to another embodiment, a base module is provided with an Ethernet hub, and each panel or each module has a dedicated twisted pair or fiber optic path to the hub. For example, a 16 port 1 gigabit Ethernet hub is provided in a base unit connected to a power entry module receiving either AC main current, or power from an external power converter. The architecture, in this case, routes the data communications either directly from each module to the hub, or through modular connectors provided in each module leading back to the hub. Alternately, each module may include its own hub/switch/router.

According to another embodiment, the modules are interconnected using a Multimedia over Coax Alliance (MoCA) 2.0 compatible system. In this case, power is supplied independently. Each device accessing the network has a physical layer interface, and typically, this device is shared for an entire module. Because the physical layer is coaxial cable, the connector for each module may be a push-on coaxial connector. However, when connecting adjacent modules, a flexible coaxial cable may be provided, e.g., with a screw on connector, to permit versatility. As necessary, signal splitters, combiners, and amplifiers may be provided.

In some cases, a 75 Ohm shielded transmission line (e.g., a coaxial-type transmission structure) maybe molded or otherwise formed in the exoskeleton, obviating the need for free cables and connectors. Baluns may be used to pass the signal over twisted paid or shielded twisted pair.

One advantage of Ethernet class communications within the set of modules is simplified wireless communications according to WiFi standards, and simplified interconnection with the Internet. However, it is understood that the data communication protocols within a module or between modules need not be according to a particular standard.

In cases where a panel requires additional or different electrical connections, and auxiliary electrical connector, such as a card edge connector, pin connector, ribbon cable, or the like, may be used. For example, a driver module may utilize a 50W amplifier, exceeding the normal specifications for the inter-module bus. The module in that case is connected to a power entry module that supports the higher power consumption, and indeed may encompass the high power amplifier itself. The driver is connected through an auxiliary electrical connection (separate from the digital communication bus in the exoskeleton) to the amplifier. For example, a circuit card may be provided within the endoskeleton, which connects to the panel. It is noted that the high power amplifier may be provided as an option, such that the same driver may be driven in a basic implementation from the exoskeleton bus, with a maximum power of e.g., 5W, and with addition of an optional amplifier module and supporting power supply as may be necessary, in a high power mode with a maximum power of e.g., 50W.

The system may be completely modular so that all different shapes and sizes easily attach to one-another allowing an individual, or many individuals together, to build a "sound-wall" or "video-wall" ever larger with the modular connections. Sizes and shapes include, but are not limited to, squares, rectangles, triangles, wedges, spheres, cylinders, hexagons, octagons, or pentagons. Any shape can house multiple drivers with all the associated touch and connection points.

Speaker housing units and options may also include the ability to control the positioning. of a speaker driver within the housing without having to physically turn the speaker via, control components such as, for example, Micromotors, ultrasonic motors, electromechanical (MEMS) components or other such devices, acting alone or in combination. Accordingly, instead of requiring the physical movement of a speaker or series of speakers to achieve the desired product placement or direction in a room, control components may allow the control of the movement of the inner speaker module or multiple modules within any housing, or allow for the alignment of the different drivers such that all sub woofers face in a desired direction, while any or all mid-range speakers are rotated in another direction, etc. Therefore, the system supports rotation of a module with respect to other modules, and control of direction of a driver within or upon a module. This allows the specific movement of any one specific speaker, or all speakers within the housing, in a multitude of directions via the software control, without physically moving the modules.

According to one embodiment, a directional speaker driver is provided on an articulated mount to the host module, connected to its amplifier through a ribbon cable. The articulated mount provides, for example, two angular axis of movement, controlled by a pair of motors, such as so-called pager motors. The control unit determines the presence of the particular speaker driver panel, including its identification number and capabilities. The controller performs an Internet lookup of the module, which permits authentication of the panel, and download of factory specifications and calibration data, for example. The Controller may also upload the entire system configuration and sensor (microphone) data mapping the environment to a cloud-based processor, which can then optimize the configuration of all modules, send commands to the control to obtain specific data required or recommended to optimize the configuration, or simply receive limited parameters which reduce the search space for the controller to optimize the configuration itself, including the angle of the speaker driver. Because of reflections within the room, sound deadening, etc., the controller may have to make further adjustments to speaker angle, equalization, echo cancellation and delay. Indeed, such changer may be appropriate as a listener moves within the environment, and for different sounds.

In some cases, a module, electrically compatible with other modules, is provided without itself being internally modular. For example, a horn speaker design may be folded within a cube, occupying the entire cube. Similarly, an acoustic suspension speaker design or a design with an active and passive radiator may benefit from sealing of the module and thus rendering the module unitary.

In some cases, a module may require a fan, for example where high average power dissipation occurs. Advantageously, acoustic control technologies and other technologies as disclosed in U.S. Pat. Nos. 7,974,714; 7,813,822; and 6,850,252, expressly incorporated herein by reference in their entirety, may be employed.

Embodiments of the modular quick connect system include user interface components for controlling the system. User interface design components may include hardware and software control components including, for example, touch-screen, speech recognition, gesture control, physical buttons, graphical user interfaces, web-based interfaces, keypad, or other such components for conveying user interaction. The user interface components may or may not be located on a remote device. Examples of remote devices include, but are not limited to, smartphones, tablets, computers, e-readers, stereos, or other such portable digital media. In other embodiments, the user interface components can be located on the module, or both the module and a remote device. Users may operate the user interface to further customize their sound experience via an application program, such as allowing multi-channel equalization, new sound patterns, specific speaker activation or sound output modifications, synchronization of sound. across multiple speakers or locations, voice activations, karaoke via synchronization of multi-party input, social media uploads or recordings, images, sounds, sharing, etc. Other control options include accessing functional elements on or in the system. The user interface may be projected from a video element located on the system, or viewed on an LCD or other monitor in, on, or around the housing, or via gesture or voice controls.

The controller is configured to allow the addition of one or more modular attachable elements such as added battery power, transducers, or amplifiers. The controller may have a rechargeable battery, for example a rechargeable cylindrical or prismatic Lithium-Ion polymer, with for example 600-5000 milliamps as a standard capacity, allowing for a certain number of hours of run-time. It should be noted that the techniques described herein may also be used with other types of batteries as well (e.g., NiCd, NiMH, etc.). The batteries and the controller may allow for quick charging and other like functions. Additionally, the controller may be configured to allow for additional add-on modular elements that may include additional power/battery modules allowing for extended, additional, or replacement power.

The controller may have updateable firmware and downloadable applications, allowing for the continued functional updates of capabilities, all controlled via the customized user interface accessible.

The controller also may act as a data collection, storage, memory, and reporting system, allowing for the collection of metadata from the user experience such as time, date, duration of use, songs, skips, drops, play frequency, ratings, for example to facilitate personalization of content, feedback or sales support.

In an illustrative embodiment, each speaker unit or any modular element therein, regardless of shape, allows for the flow of data, commands, communication, and power distribution both vertically and horizontally, so signals can flow to any one or all attached modular audio/video systems or controlled speakers, or any additional modules, connectors, or accessories.

On the face of each speaker configuration, the user may also find, in addition to the ability to customize and exchange grills, one or many accessory ports. These ports allow for the attachment of accessories such as lighting elements (e.g., LEDs), Displays (i.e. LCDs), GPS, FM/AM radios, MP3/digital audio players, cameras, projectors, etc., all managed by the controller and the control panel. The ports also may allow for the attachment of additional speakers, or modules, and allow for numerous product configurations. Additionally, the system may allow for the direct access to Internet programming, channels, content, via the cloud, WiFi, wirelessly, and channels for direct playback of content, some of which may be exclusively available to users of the system (i.e., private channels). The controller may support content protection and/or encryption/decryption, and preferably supports secure communication channels, especially outside of the system.

Each accessory and speaker element may be assigned its own identification number, which can be verified during an on-line registration process, which may be used to activate the component and/or new features of the component. Further, in a social environment where people share their components during a gathering, the identification of components can assist in retrieving one's own components.

The disclosed inventive concept is designed, in one aspect, to allow for the complete customization of your own listening experience without the limiting factor of purchasing off-the-shelf audio output devices. Realizing that experiences and listening taste may change over time, the system is modular and updateable, allowing for a lifetime of changes in speaker size, type, functionality, accessories, in conjunction with social engagement tools and smart controls.

Embodiments of the modular quick-connect audio/visual system can not only be stacked, configured, reconfigured, up-down-sideways, but also have complete customizable accessory elements that can be plugged in/out on multiple ports/points on each side of a unit. For example, a modular quick-connect audio/visual apparatus may include, as a customizable accessory element, a grill that would be customizable with colors, lights, initials, etc. Additionally, other embodiments include ports for the insertion of "Power Pills", or modular elements that can supply a variety of enhancements from added signal amplification, power, transducers, radiators, radios, antennas, connection points to power multiple units, etc. These Power Pills can also take the form of a stand, housing, bumpers, or feet that attach to or on the system, for example, either at the controller or control plate area. Additionally, this technology facilitates the shared music experience by allowing the multiple owners of the adaptable, modular audio/video systems to easily attach their respective systems together on the fly to create ever larger "walls of sound" with the built in connectivity functions, or for sharing contest across multiple platforms.

A control module may include, for example, a single or multicore CPU, random access memory, non-volatile memory graphic coprocessor, sensors (i.e., accelerometers, gyroscopes, magnetometers, proximity, rotation, thermometer, wind, humidity, etc.), communications interface (Ethernet, WiFi, Bluetooth), repeater/router/firewall functions, video interface (e.g., HDMI, DVI, etc.), infrared interface, NFC interface, cellular network interface (2G, 3G, 4G, LTE, LTE+LAA, Zigbee, ZWave, etc.), antenna(s), amplifiers, audio and analog interface, microphone or microphone array, power control and power interface, battery interface, inductive charging interface, trusted platform module, motor/actuator control, LED driver, touchscreen interface, noise cancellation circuitry, echo cancellation, POTS interface, VOIP support, SD/micro card reader, speakerphone, video/still camera, proximity sensor, fingerprint scanner, etc. In general, the electronics within the controller may comprise a superset of an advanced smartphone, such as the iPhone 6 or Samsung Galaxy S5, with at least all components and capabilities provided in such a device.

For example, the controller may include 128 GB of flash memory, have a 4.7-5.5 inch diagonal multitouch touchscreen display with 1920×1080 (FHD) pixel resolution, 500 cd/m2 max brightness, oleophobic coating on front of touchscreen, quad core ARM architecture processor running at 2.5-3 GHz, a graphics coprocessor, a sensor interface coprocessor, an 8-25 megapixel autofocus camera with 16× zoom and servo-controlled pan/tilt/zoom mount, optical image stabilization, LED flash, GPS, fingerprint sensor, UMTS/HSPA+/DC-HSDPA (850, 900, 1700/2100, 1900, 2100 MHz), GSM/EDGE (850, 900, 1800, 1900 MHz), LTE (Bands 1, 2, 3, 4, 5, 7, 8, 13, 17, 18, 19, 20, 25, 26, 28, 29), CDMA EV-DO Rev. A and Rev. B (800, 1700/2100, 1900, 2100 MHz), TD-SCDMA 1900 (F), 2000 (A), FDD-LTE (Bands 1, 2, 3, 4, 5, 7, 8, 13, 17, 18, 19, 20, 25, 26, 28, 29), TD-LTE (Bands 38, 39, 40, 41), 802.11a/b/g/n/ac/ad Wi-Fi, Bluetooth 4.0 wireless technology, NFC, Assisted GPS and GLONASS, Digital compass, H.264/H.265, Voice over LTE (VoLTE), Audio formats: AAC (8 to 320 Kbps), Protected AAC (from iTunes Store), HE-AAC, MP3 (8 to 320 Kbps), MP3 VBR, Audible (formats 2, 3, 4, Audible Enhanced Audio, AAX, and AAX+), Apple Lossless, AIFF, and WAV, Video formats: H.264 video up to 1080p, 60 frames per second, High Profile level 4.2 with AAC-LC audio up to 160 Kbps, 48 kHz, stereo audio in .m4v, .mp4, and .mov file formats; MPEG-4 video up to 2.5 Mbps, 640 by 480 pixels, 30 frames per second, Simple Profile with AAC-LC audio up to 160 Kbps per channel, 48 kHz, stereo audio in .m4v, .mp4, and .mov file formats; Motion JPEG (M-JPEG) up to 35 Mbps, 1280 by 720 pixels, 30 frames per second, audio in μlaw, PCM stereo audio in .avi file format, speech recognition, micro USB, HDMI, Lightening, Thunderbolt, 3.5-mm stereo headphone minijack, Built-in rechargeable lithium-ion battery, Barometer, Three-axis gyro, 3 axis-Accelerometer, Proximity sensor, Ambient light sensor, Zigbee (IEEE-801.15.4), Z-wave, UWB, and 1080P video projector.

According to one embodiment, a module provides an interface to a smart home and security system. In this capacity, it can arm and disarm the alarm and provide all control signals, display status of the system, provide monitoring of surveillance cameras, provide control over entries and lights (e.g., Z-wave devices), Temperature adjustment (HVAC, radiant heat, thermostat etc.), check monitors (who's home, where in home, 2-way communications), check phone messages, alert and emergency messages and notifications, control of appliances (oven, coffee machine, fridge etc.), garage door, control of music, control of TV and other entertainment system components (DVR, cable, etc.), open or close shades, monitor consumption (water, electric, gas), read sensor panels (flood, carbon monoxide, mold, allergens etc.), control/monitor sprinkler systems, proximity detection (on enter, on exit etc.), interface to robotic controls (Roomba, lawnmowers etc.), monitor/regulate solar panel systems, monitor well water level, monitor septic and oil tanks, emergency shutoff capabilities, garbage level monitoring, electronic clothing rack control, control air scrubbers based on allergen detectors, newspaper/mail/package tracking, gate control/access control, parental controls (TV, WiFi etc.), medical and health monitoring (monitored pill cases etc.), interface with smartwear for medical monitoring (heart rate, blood pressure etc.), connection to emergency services, drinking water monitoring, etc.

The controller may also provide an interface with smartwear and sports/fitness monitoring equipment, automotive/telematics equipment, GPS interface with schedule or with car, provide remote start for car (AC, defroster), OBDII interface, monitor car battery, monitor tire pressure, consumption monitoring and auto replenishment capabilities, set triggers (alarm clock etc.), external weather monitoring (temperature, snow accumulation etc.), storm warning and monitoring, general purpose computing, social networking, and communications, such as providing interface with email and schedule systems, interface with news/information/travel information sites, cell signal blocker/repeater, dangerous sound level monitoring, etc.

The system may provide various intelligent features, such as picking the most played songs off of registered users playlist local to their own music playback device such as their phone, within a specified geographic area, for playback on the "owner/controller' quick-connect system locally. A user may send play list requests to people at a location, and either give access to playlist, or give access to their own playlist for playback. A battle function is also provided, in which the speakers phase out according to who is singing/beat boxing, etc. There is an emphasis on that person's speaker rather than coming out of all of them. The controller may support Internet radio channels, and services, such as Spotify and Rhapsody. Similarly, video channels may be controlled and presented, such as Netflix, YouTube, Vimeo, and the like.

The system may further provide karaoke functionality, for single or multi users, which utilize the multichannel CSR capabilities. For example, thirty individuals may be invited on their phones in a location to sing together into applications on their phones, or via a link supplied by an owner/controller, and have all voices compiled for playback on the quick-connect device with ability to play any one or all of the individual voice channels out loud, with ability to record the combined audio signal, ability to upload the signal, ability to apply sound effects to the signal, and an ability to record and redistribute to all participants the final recording. The system may also provide DJ Applications, for ways to use with the system to mix music with devices in different locations within a geographical area.

The system typically provides loudspeaker functionality, which permits overriding of normal audio playback with either real-time announcements, or to playback predetermined messages at specific times (preset). Modules separated from each other can provide conferencing/videoconferencing capabilities.

According to one embodiment, a baby monitor system is provided, which has audio and video monitoring of an infant, with the additional ability to adaptively play music (e.g., lullabies) based on the activity and noise level of the infant. A module in proximity to the infant communicates with a remote module in proximity to the parent, who can monitor and control the baby monitor.

The controller performs traditional audio control functions, such as source selection, equalization, output selection, volume control, etc. When a preferred soundscape is created, it may be saved as a favorite, and recalled by a custom label.

The controller may produce light patterns through controllable color LEDs, which may emit point source light or diffuse light, in a static or pulsating pattern. The light may be controlled based on acoustic patterns, visual patterns detected through a camera, or monitoring of a data stream.

The modules of the system may be used to provide an advertising unit, to attract customers. This can be used to create crowd share pop-up sales location for flash sales of product, accessories, and/or services. The modules may be provided to leave messages, content, recordings for a user at a geographic location. The modules may provide promotional channels for ad/product/discount space selling with possible mobile coupon within application for registered users.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents and any description contained herein.

What is claimed is:

1. A speaker system in a housing, comprising:
   at least one loudspeaker configured to reproduce an audio output signal based on an electrical signal;
   a microphone array, within the housing, configured to produce an audio input signal;
   at least one illuminated element;
   a wireless digital packet communication network interface, within the housing, configured to bidirectionally communicate data over a wireless digital packet communication network; and
   an automated digital processor, configured to:
      receive a user interface defined based on information received through the wireless digital packet communication network interface,
      receive the audio input signal from the microphone array,
      process the received audio input signal to recognize a voice command associated with the received user interface,
      generate the electrical signal for reproduction by the at least one loudspeaker, dependent on at least the voice command and a set of equalizer parameters,
      conduct a bidirectional speech communication using the loudspeaker and the microphone array,
      perform echo cancellation on the audio input signal, and
      control the at least one illuminated element and a remote device, dependent on at least the voice command.

2. The speaker system according to claim 1, wherein the automated processor is further configured to control a smart-home interface, dependent on the voice command and the bidirectionally communicated data.

3. The speaker system according to claim 1, wherein the at least one loudspeaker comprises a modular loudspeaker, wherein the modular loudspeaker is separable from the housing.

4. The speaker system according to claim 3, wherein the loudspeaker comprises a memory device, configured to identify the at least one loudspeaker to the automated digital processor.

5. The speaker system according to claim 1, wherein the automated digital processor is configured to receive and respond to at least one gesture from a user.

6. The speaker system according to claim 1, further comprising an imaging sensor, wherein the automated digital processor is further configured to receive, process, and communicate an image from the imaging sensor.

7. The speaker system according to claim 1, further comprising an imaging display, configured to present graphic images to a user.

8. The speaker system according to claim 1, further comprising an image projector configured to project an image on to a surface.

9. The speaker system according to claim 1, further comprising a wireless communication interface selected from the group consisting of at least one of Zigbee, IEEE-802.15.4, and Z-wave.

10. A method of operating a speaker system, comprising:
    providing a housing having at least one loudspeaker for reproducing an audio signal, a microphone array for receiving an acoustic signal, an illuminated element, a wireless digital packet communication network interface, and an automated digital processor;
    receive a user interface defined based on information received through the wireless digital packet communication network interface;

receiving the acoustic signal from the microphone array;

generating the audio signal for the at least one loudspeaker;

performing echo cancellation on the acoustic signal;

performing equalization of the audio signal;

conducting a bidirectional speech communication using the loudspeaker and the microphone array;

recognizing a voice command present in an environment surrounding the housing in accordance with the received user interface; and controlling the at least one illuminated element and a remote device, dependent on at least the recognized voice command.

11. The method according to claim 10, further comprising controlling a smarthome interface dependent on the voice command and data received through the bidirectionally communicated data.

12. The method according to claim 10, further comprising controlling a medical device dependent on the voice command and data received through the bidirectionally communicated data.

13. The method according to claim 10, further comprising generating the audio signal for at least one additional loudspeaker distinctly located with respect to the at least one loudspeaker.

14. The method according to claim 10, further comprising providing a camera, receiving an image from the camera, and processing the received image with the automated digital processor.

15. The method according to claim 10, wherein the at least one loudspeaker comprises a modular loudspeaker, further comprising:

replacing the modular loudspeaker of a first type with a modular loudspeaker of a second type;

determining the second type; and selectively generating the audio signal for the at least one loudspeaker dependent on the second type.

16. The method according to claim 10, further comprising receiving at least one gesture from a user in the environment, and selectively controlling the speaker system selectively dependent on the at least one gesture.

17. The method according to claim 10, further comprising receiving an image from an imaging sensor, and communicating the image through the wireless digital packet communication network interface.

18. The method according to claim 10, further comprising presenting a graphic display image to a user in the environment.

19. A communication system in a housing, comprising:

a microphone array, within the housing, configured to produce a signal dependent on environmental sounds;

at least one illuminated element;

a wireless digital packet communication network interface, within the housing, configured to bidirectionally communicate data over a wireless digital packet communication network according to at least a Wifi protocol and an IEEE-802.15 protocol; and an automated digital processor, configured to:

receive information defining a user interface defined through the wireless digital packet communication network interface;

receive the signal from the microphone array;

process the signal to recognize a voice command based on the defined user interface;

selectively communicate over the wireless digital packet communication network interface dependent on the recognized voice command;

generate an acoustic output electrical signal for reproduction by a speaker driver, dependent on at least the recognized voice command and a frequency equalizer parameter;

conduct a bidirectional speech communication using the speaker driver and the microphone array, as a transducer pair, within a common acoustic environment, with another remotely located transducer pair;

perform echo cancellation on the signal, and control the at least one illuminated element and at least one remote device, dependent on at least the recognized voice command.

20. The communication device according to claim 19, wherein the speaker driver is located within the housing, further comprising a graphic display interface, a video camera, a wireless communication interface selected from the group consisting of at least one of Zigbee, IEEE-802.15.4, and Z-wave, wherein the automated digital processor is further configured to map an environment according to at least the signal.

* * * * *